(No Model.)

O. H. CONGAR.
GRAFTING IMPLEMENT.

No. 340,699. Patented Apr. 27, 1886.

Witnesses,
Geo. H. Strong.
J. H. Nurse.

Inventor,
O. H. Congar
By
Dewey & Co.
Attorneys

UNITED STATES PATENT OFFICE.

ORVILLE H. CONGAR, OF PASADENA, CALIFORNIA.

GRAFTING IMPLEMENT.

SPECIFICATION forming part of Letters Patent No. 340,699, dated April 27, 1886.

Application filed April 20, 1885. Serial No. 162,839. (No model.)

*To all whom it may concern:*

Be it known that I, ORVILLE H. CONGAR, of Pasadena, county of Los Angeles, and State of California, have invented an Improvement in Grafting Implements; and I hereby declare the following to be a full, clear, and exact description thereof.

My invention relates to the class of grafting implements which are designed for properly preparing the stock for that intimate bark-union with the scion which is necessary for the complete success of the operation.

My invention consists of a stock or handle carrying a peculiarly-adjustable and self-discharging approximately U-shaped or angular knife adapted to penetrate the edge of the stock, and in a swinging hammer-head attached to the stock and carrying a blade or chisel adapted to make a cut in the side of the stock at right angles to the U-shaped knife and immediately below it, whereby a core is cut out, the removal of which leaves a mortise for the reception of the scion, which is properly prepared by means of a tool which forms the subject-matter of another application for a patent.

The object of my invention is to provide a suitable tool for preparing the stock to receive the scion and for the accomplishment of an improved grafting union or joint.

Figure 1:
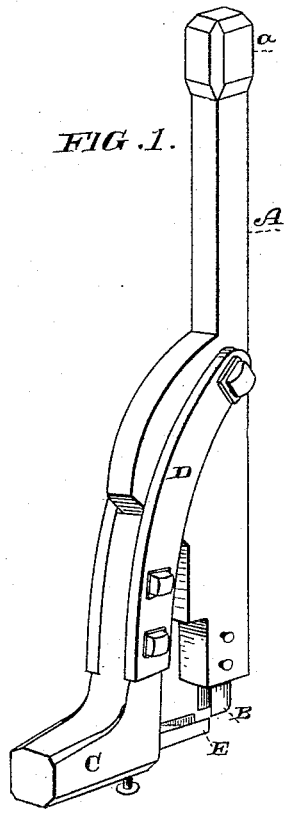
Figure 2:
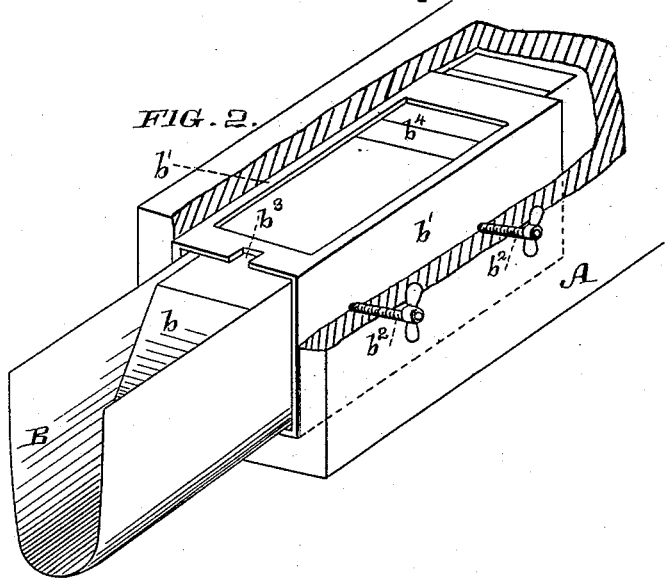
Figure 3:
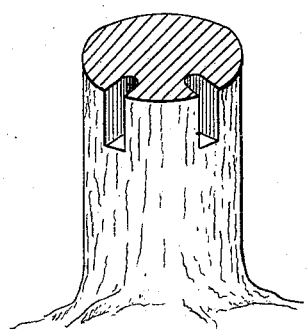
Figure 4:
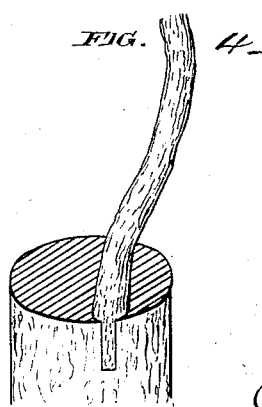

Referring to the accompanying drawings, Figure 1 is a perspective view of my grafting implement. Fig. 2 is a view of the U-shaped mortise-knife, showing its peculiarities of construction. Fig. 3 shows the stock as prepared with its proper mortise. Fig. 4 shows the grafting-union between the stock and the scion.

In Fig. 1, A is a handle provided with a head, $a$, adapting it to receive a blow. In the lower end of the handle A is an approximately U-shaped knife, B, the peculiarity of whose construction and mounting in the handle I shall hereinafter describe.

C is a hammer-head connected with the handle A by a double link or yoke, D, pivoted to said handle. In the inner face of the hammer-head is an angular three-sided gouge, chisel, or blade, E, which is so located as to make a cut at right angles with the U-shaped knife B, and immediately below it.

The operation of this implement in preparing the mortise in the stock is as follows: The handle A is held in an upright position, with its U-shaped knife B resting on the edge of the stock. A blow or other force is then applied to said handle sufficient to drive the knife B down to a depth which is regulated by the proper adjustment of said knife. A blow or other force is then applied to the hammer-head C, causing the angular blade E to penetrate the side of the stock immediately below the incision made by the U-shaped blade, whereby the core in the wood is detached and may be removed, forming the mortise, as shown in Fig. 3.

In order to make the U-shaped knife as complete as possible, to perform all the requirements of the operation, I construct it as shown in Fig. 2. At a short distance back of its point is a backwardly-beveled core, $b$, by which the wood of the core or chips of the mortise are discharged. The knife is mounted in a metal casing, $b'$, which fits within a socket made within the end of the handle A, and is there held by set-screws $b^2$, which pass through the walls of the handle, impinging against the casing $b'$, this impingement of the screws being of sufficient force not only to hold said casing to its seat, but also to cause it to press or bind upon the knife B, whereby said knife is properly held in the casing. In the front of the top of the casing is a small notch or aperture, $b^3$, to permit the insertion of a small implement for the purpose of relieving the chips, if they should become clogged in the knife.

Between the rear end of the knife and the rear wall of the socket in the handle a space is left for the insertion of washers $b^4$, the number and width of which determine the longitudinal adjustment of the blade B.

The knife B need not necessarily be U-shaped, for it may be of an angular three-sided shape in cross-section, though I do not prefer such a shape on account of the increased resistance it would meet in penetrating the stock.

It is obvious from the character and shape of the mortise made in the stock, as shown in Fig. 3, that the scion must be prepared with a tenon adapted to fit closely said mortise. The means by which this tenon is prepared is the subject-matter of another application for a patent and need not be described herein; but in Fig. 4 it will be seen what the character of the grafting-union is.

I do not wish to confine myself to the precise construction of the implement as shown and described, for it may be modified in many particulars without changing the nature of the invention, which lies more particularly in the knives and their relative positions to each other, rather than in the particular means by which power is applied to them.

Having thus described my invention, what I claim as new, and desire to secure by Letters Patent, is—

1. In a tool or implement for grafting, the combination, with a suitable handle, of an approximately U-shaped knife for penetrating the edge of the stock, and a blade seated in a pivoted frame and operating at right angles and at the base of the knife for penetrating the side of the stock, substantially as herein described.

2. In a tool or implement for grafting, the combination, with a suitable handle, of an approximately U-shaped knife, means for adjusting the same, and a frame pivoted to the handle and provided with a blade arranged at right angles to and at the base of the knife, substantially as herein described.

3. In a tool or implement for grafting, a handle having an approximately U-shaped knife secured to its lower end and adapted to penetrate the edge of the stock, in combination with a swinging hammer-head pivoted to the handle and moving at right angles thereto, and a blade secured in the hammer-head and operating at its base and at right angles to the knife, whereby the core cut by the knife is detached and a mortise formed, substantially as and for the purpose herein described.

4. In a tool or implement for grafting, the handle A, having a head, $a$, to receive a blow, and the approximately U-shaped knife B, seated in the base of the handle, in combination with a hammer-head, C, the yoke D, pivoting said hammer-head and handle, and the angular gouge blade or chisel E in the inner face of the hammer-head and operating at right angles to the U-shaped knife and at its base, substantially as described.

5. In a tool or implement for grafting, the handle A, having a socket in its base, in combination with the metal casing $b'$ in said socket, the U-shaped knife B in the casing, the set-screws $b^2$, holding said casing in the socket, and holding the knife in the casing, substantially as described.

6. In a tool or implement for grafting, the handle A, in combination with the U-shaped knife B, seated in its lower end, the casing $b'$, and the core $b$, having a beveled portion for the discharge of the chips, substantially as herein described.

7. In a tool or implement for grafting, the handle A, having a socket in its base, the casing $b'$ in said socket, the knife B in said casing, the set-screws $b^2$, by which the parts are seated, and the washers $b^4$ between the rear end of the knife and the rear wall of the socket, whereby the adjustment of said knife is effected and controlled, substantially as described.

In witness whereof I have hereunto set my hand.

ORVILLE H. CONGAR.

Witnesses:
BYRON O. CLARK,
THEODORE P. LUKENS.